United States Patent

Holtz

[11] 4,368,912
[45] Jan. 18, 1983

[54] SLIDE HOLDER AND TRANSFER DEVICE

[76] Inventor: Leonard Holtz, 418 Jordan St., Oceanside, N.Y. 11572

[21] Appl. No.: 213,090

[22] Filed: Dec. 4, 1980

[51] Int. Cl.³ .......................... A44B 21/00; B66C 1/48
[52] U.S. Cl. ................................ 294/87 R; 24/255 R; 294/99 R
[58] Field of Search .............. 294/16, 27 R, 33, 87 R, 294/99 R, 166; 24/255 R, 259 R; 206/456; 353/103, 118

[56] References Cited

U.S. PATENT DOCUMENTS

| 1,268,919 | 6/1918 | Bleile | 294/87 R X |
|---|---|---|---|
| 1,429,182 | 9/1922 | Ashley | 24/259 R |
| 1,435,917 | 11/1922 | Ensign | 24/255 R |
| 1,965,554 | 7/1934 | Mainwaring | 24/259 R |
| 2,487,040 | 11/1949 | Bilodeau | 294/87 R |
| 2,698,765 | 1/1955 | Eagle | 294/87 R |
| 3,133,332 | 5/1964 | Johnson | 294/87 R X |
| 3,244,273 | 4/1966 | Wiklund | 206/456 |
| 3,400,843 | 9/1968 | Johnson | 294/16 X |
| 3,427,739 | 2/1969 | Robinson | 353/103 X |
| 3,552,846 | 1/1971 | Hansen | 353/103 |
| 3,672,490 | 6/1972 | Desmarais et al. | 206/456 |
| 3,701,558 | 7/1971 | Baker | 294/33 |
| 3,711,905 | 6/1973 | Eckerdt et al. | 294/87 R |
| 4,071,930 | 2/1978 | Tanaka | 24/255 R X |
| 4,094,483 | 6/1978 | Busch | 24/255 R X |
| 4,114,166 | 9/1978 | Driscoll et al. | 206/456 X |

Primary Examiner—Johnny D. Cherry
Attorney, Agent, or Firm—Frishauf, Holtz, Goodman and Woodward

[57] ABSTRACT

A slide holder and transfer device which is preferably fabricated of a single integral member has side gripping members which are always resiliently biased toward a slide gripping position by a resilient biasing member which bridges a group of slides. Manual gripping members are provided for flexing the first resilient biasing member against the bias thereof to move the side gripping members apart for either engaging a group of slides or for releasing a previously engaged group of slides. Even when the side gripping members are in such spaced apart condition, they are resiliently biased toward their more closely spaced relative position by the first resilient biasing member.

12 Claims, 9 Drawing Figures

SLIDE HOLDER AND TRANSFER DEVICE

BACKGROUND OF THE INVENTION

The present invention relates to a slide holder and slide transfer device, and more particularly to a slide holder which releasably grips a group of photographic slides or transparency mounts to facilitate handling of the slides in a stack or group.

Prior art slide holders and transfer devices are disclosed, for example, in U.S. Pat. Nos. 3,711,905; 3,552,846; 3,244,273; and 2,698,765. All of these prior art slide holders are of relatively complex design, and/or are difficult to use and manipulate, and/or are expensive to manufacture.

The object of the present invention is to provide a simplified slide holder and transfer device (hereinafter referred to simply as "slide holder"), which is easy to use and manipulate, of simple mechanical design and which is therefore relatively easy and inexpensive to manufacture.

SUMMARY OF THE INVENTION

In accordance with the present invention, a slide holder and transfer device for receiving and releasably holding a group of slides in a stack, comprises a first resilient biasing member for bridging a group of slides over at least one dimension of each slide of the group of slides, and over the length or height of the stack of slides; a pair of spaced apart side gripping members coupled to opposite sides of the first member and adapted to grip the group of slides on opposite sides thereof, the first member always resiliently biasing the side gripping members toward a first relative position in which the side gripping members are spaced apart a distance which is less than one dimension of each of the slides, and the side gripping members being adapted to be movable relative to each other by resilient flexing of the first member to a second relative position in which the side gripping members are spaced apart a distance greater than the one dimension of the slides; and manual gripping means coupled to the first member and/or to the pair of side members for being manually operated to flex the first member against the bias thereof to cause the side members to move apart to the second relative position in which the spacing between the side members exceeds the one dimension of each of the slides, the side members being resiliently biased by the first member toward the first relative position so that after release of the manual gripping means the slides of the stack are held in a stack by the side gripping members.

In a preferred embodiment, the slide holder and slide transfer device is made of a resilient plastic material which inherently provides the biasing effect.

DETAILED DESCRIPTION

Figure 2:
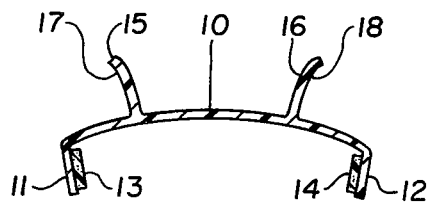
FIG. 2 is a sectional view taken along the line 2—2 in FIG. 1.
Figure 3:
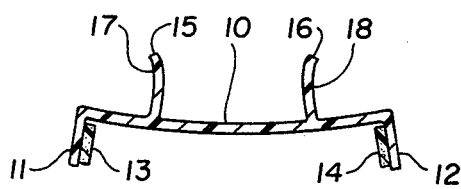
FIG. 3 is a sectional view, similar to FIG. 2, but with the device in its flexed condition ready for engagement with a group or stack of slides.
Figure 4:
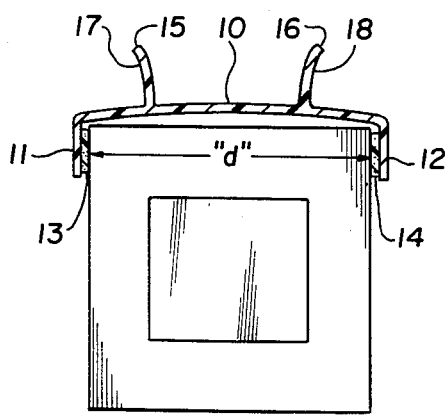
FIG. 4 is a sectional view similar to FIGS. 2 and 3 but showing the device engaged with a stack of slides.

Referring to FIGS. 1–5, the first embodiment of the invention comprises a main bridging or spanning member 10 (hereinafter referred to as bridging member) which is generally rectangular in plan view and which is made of a flexible, resilient material which has inherent biasing qualities. Plastic materials, such as polyethylene, are preferred. The bridging member 10 is dimensioned so as to be slightly larger than a given dimension "d" of a slide (see FIG. 4) and to be slightly longer than the maximum length or height of the group of stack of slides which are to be held by the slide holder (see FIG. 5). Extending downwardly from opposite sides of bridging member 10 are respective side gripping members 11,12 which are preferably integrally formed with bridging member 10, for example by molding. Side gripping members 11,12 have respective resilient pads 13,14 thereon for enhancing gripping of the sides of the slides, for example as shown in FIG. 4. Resilient pads 13,14 may be foam rubber or foam plastic material which is secured to side gripping members 11,12 for example by adhesive or an adhesive backing.

Also provided on bridging member 10 is a pair of manual gripping members 15,16, which are spaced apart and which are adapted to be manually gripped by the fingers of an operator for flexing the bridging member from the position shown in FIG. 2 to substantially the position shown in FIG. 3 for either engaging or releasing a group or stack of slides. The gripping and operating members 15,16 are also preferably integrally formed with bridging member 10, for example by molding.

Figure 5:
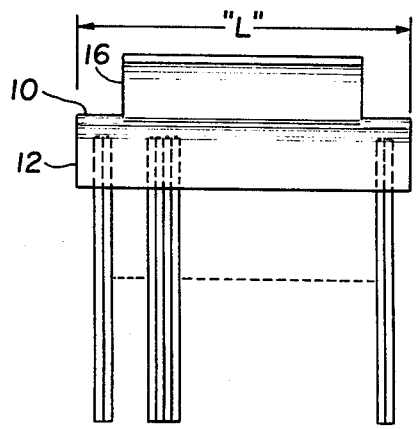
FIG. 5 is a side view of the arrangement shown in FIG. 4 with the device engaging a stack of slides.

In operation, the user grips the gripping members 15,16 and squeezes them together so as to flex the bridging member from the convex condition shown in FIG. 2 to the concave condition shown in FIG. 3 whereby the side gripping members 11,12 are spread apart so that they are spaced apart a distance greater than the dimension "d" of the slide. Then, the slide holder is placed over a group of slides and the gripping members 15,16 are released, whereby the resilient biasing effect of the bridging member 10 biases the side gripping members 11,12 toward their initial position shown in FIGS. 1 and 2 so that they grip the sides of the slides, as shown in FIGS. 4 and 5. The degree of gripping force is determined by the biasing force of the briding member 10.

The gripping members 15,16 are curved outwardly, as shown at 17 and 18 to facilitate gripping and handling of the device by the user and to prevent the device from slipping out of the fingers of the user when it is in its flexed condition, such as shown in FIG. 3.

Figure 6:
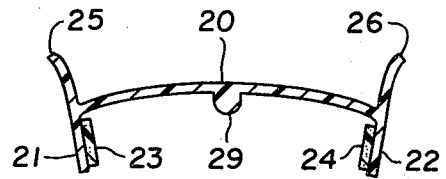
FIG. 6 is a sectional view of a modified embodiment of the invention.

FIG. 6 is a sectional view (similar to the sectional views of FIGS. 2 and 3) of a modified arrangement wherein the bridging member 20 has a protrusion 29 extending downwardly therefrom and extending over the complete length of the bridging member 20. If desired, the protrusion need not be made as long as the bridging member 20, but may stop short of the ends thereof. The side gripping members 21,22 and the associated resilient pads 23,24 are substantially identical with the corresponding side gripping members and respective pads shown in the embodiment of FIGS. 1–5. The manual gripping members 25,26 in the embodiment of FIG. 6 are shown extending from the side gripping members 21,22. This is an alternate arrangement to the arrangement shown in FIGS. 1–5. In use, when the device of FIG. 6 engages a stack of slides, for example as shown in FIG. 5, when the manual gripping members 25,26 are squeezed toward each other to flex the bridging member 20 to substantially the condition shown in FIG. 3, the protrusion 29 bears downwardly on the slides which were engaged by the holder to facilitate releasing of the slides. A similar effect is achieved by the concave central portion in the embodiment shown in FIG. 3, but this effect is improved with the special protrusion 29 provided in the embodiment of FIG. 6.

Figure 1:
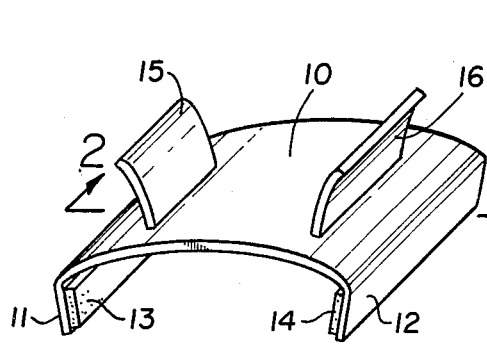
FIG. 1 is a perspective view of an embodiment of the invention.
Figures 7, 9:
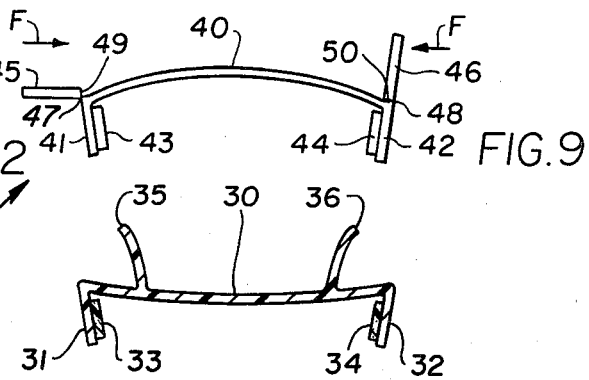
FIGS. 7 and 8 are sectional views of another modified embodiment of the invention, FIG. 7 illustrating the device in its "relaxed" state, and FIG. 8 illustrating the device in its flexed state ready to engage a stack or group of slides.
FIG. 9 is an end elevation of another modified embodiment of the invention.
Figure 8:
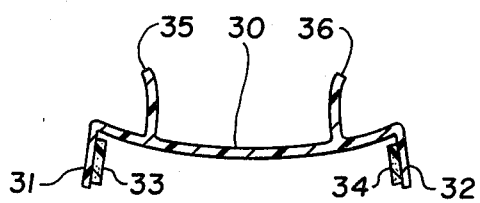

FIGS. 7 and 8 are sectional views, similar to sectional views of FIGS. 2 and 3, wherein the bridging member 30 is always in a generally concave condition. FIG. 7 illustrates the device in its "rest" or relaxed condition, and FIG. 8 illustrates the device in its flexed or operative condition for either releasing a previously engaged stack of slides, or for being in condition for receiving a stack of slides for engagement. The side gripping members 31,32 and associated resilient pads 33,34 are substantially identical with those corresponding elements shown in FIGS. 1–4. Similarly, the manual gripping members 35,36 of FIGS. 7 and 8 are substantially similar to gripping members 15,16 of FIGS. 1–5. Alternatively, gripping members similar to gripping members 25,26 of FIG. 6 may be provided in the embodiment of FIGS. 7 and 8.

As mentioned above, the device is preferably fabricated integrally of a single molded piece, for example plastic materials such as polyethylene, or similar materials having flexibility, but also having a "memory" so that the resilient biasing effect is provided. All of the embodiments are preferably wide enough to receive a slide with a dimension "d" of approximately 2 inches and are long enough to engage and hold a stack of approximately 40 slides (see FIG. 5). A length "L" (FIG. 5) of approximately 2 inches is sufficient for this purpose.

FIG. 9 illustrates a further modified arrangement wherein the manual gripping members 45, 46 are integrally formed with the bridging member 40 and are interconnected by a "living hinge" type of interconnection, for example as indicated at 47 and 48. The gripping member 45 in FIG. 9 is shown in a folded-over position, whereas the gripping member 46 is shown in its operable position. The advantage of this arrangement is that the gripping members 45, 46 can be folded over, as shown with respect to gripping member 45 in FIG. 9, and in fact can be folded over even farther, if desired, to present a lower profile so that the slide handling device of the present invention is more easily stored. In use, the gripping members 45, 46 are pivoted about the respective "living hinge" connections 47, 48 to the position shown by gripping member 46 in FIG. 9. In this position, the respective bottom surfaces 49, 50 of the gripping members 45, 46 bear against the upper surface of bridging member 40 when a force is applied against gripping members 45, 46 to deform the bridging member to the position shown, for example, in FIG. 3. Clearly, the force is applied in the direction of arrows F in FIG. 9. The device of FIG. 9 is preferably formed of plastic material, rather than other materials, such as metal or the like, since plastic material is more adaptable to providing a living hinge-type of connection between the gripping members and the bridging member.

While the invention has been described above with respect to specific embodiments, it should be clear that various modifications and alterations can be made within the scope of appended claims. For example, the device may be made in more than one piece—the bridging member 10 may be fabricated separately from the side gripping members 11, 12 and the structure then secured together, the hand or manual gripping members 15, 16 need not be integral with the bridging member 10—they may be attached later by means of adhesive, screws, rivets or other suitable means. The device may also be fabricated from metal, rather than plastic. The above modifications are only exemplary of numerous modifications which can be made within the scope of the inventive concept whereby a simple slide holder having no moving parts (that is, moving parts in the normal sense of the term), which is simple to use and simple to fabricate, is provided.

I claim:

1. A slide holder and transfer system including a group of rigid generally flat and generally rectangular photographic slides arranged in a stack, the side, top and bottom edges of said slides defining the generally rectangular shape thereof, and a device for receiving, releasably holding and transferring the slides in a stacked condition, the receiving, holding and transferring device comprising:

a first generally rectangular resilient biasing member normally in a given profile shape which is upwardly bowed over the whole surface thereof so as to be convex, and being resiliently bendable against an inherent biasing force to a deformed profile shape wherein the convex shape is varied, for bridging the stack of slides over one of the top or bottom edge of each generally rectangular slide of said stack of slides, and over the length or height of said stack of slides;

a pair of spaced apart elongated side gripping members coupled to and extending from opposite sides of said first member and extending from said first member a distance substantially less than the length of the sides of the slides, said side gripping members being adapted to grip the top side edge portion of each and every slide in said stack of slides on respective opposite side edges of said slides with the substantially flat faces of said slides substantially perpendicular to said elongated side gripping members, said first member always overlying the top ends of said slides and resiliently biasing said side gripping members toward a first relative position in which said side gripping members are spaced apart a substantial distance which is less than the length of the top and bottom edge of each of said slides, and said side gripping members being adapted to be movable relative to each other to a second relative position by resilient flexing of said first member to its deformed profile shape, said second relative position of said side gripping members being a position in which said side gripping members are spaced apart a distance greater than said length of the top and bottom edge of each of said slides, said side gripping members being biassed toward said first relative position by said inherent biassing force of said first member even when they are in said second relative position; and a pair of spaced apart upstanding manual gripping means extending substantially perpendicularly upward directly from said first member and being integral with said first member for being manually gripped and moved toward each other to flex said first member to said deformed profile shape against said inherent bias thereof to cause said side gripping members to move apart to said second relative position in which said spacing between said side gripping members exceeds said length of the top or bottom edge of each of said slides, said side gripping members being resiliently biased by said first member towards said first position so that after release of said manual gripping means, said side gripping members resiliently move toward their said first position to clamp the upper side edge portions of said slides of said stack between said side gripping members such that said slides are held in a stack by said side gripping members.

2. The system of claim 1 wherein said side gripping members are integrally formed with said first resilient biasing member.

3. The system of claim 1 wherein said first resilient biasing member is resiliently flexible to a concave deformed profile shape when said side gripping members are in said second relative position.

4. The system of claim 3, wherein said first member comprises a projection extending along a generally central portion thereof from the lower surface thereof and extending generally parallel to said elongated side gripping members for abutting against the upper edges of said slides when said first member is resiliently deformed to its concave shape to aid in disengaging said stack of slides from said receiving, holding and transferring device.

5. The system of claim 1 wherein each of said pair of manual gripping means is integrally formed with said first member via a thin living-hinge-type connection, and is foldable relative to said first member.

6. The system of claim 5 wherein said manual gripping means are foldable to a position so as to be located in a position substantially parallel with said first member, and comprising respective bearing surfaces adjacent said living-hinge-type connection for abutting against said first member when said manual gripping means are in their upstanding positions relative to said first member.

7. The system of claim 1, wherein said side gripping members extend generally perpendicularly from said first member.

8. A slide holder and transfer device for receiving, releasably holding and transferring a group of rigid, generally rectangular slides arranged in a stack, the sides, top and bottom edges of said slides defining the generally rectangular shape of said slides, the slide holder and transfer device comprising:

a first resilient biasing member normally in a given profile shape and being resiliently bendable against an inherent biassing force to a deformed profile shape, for bridging the stack of slides over one of the top or bottom edge of each slide of said stack of slides, and over the length or height of said stack of slides;

a pair of spaced apart elongated side gripping members substantially shorter than the side of the slides coupled to and extending from opposite sides of said first member and extending from said first member a distance substantially less than the length of the sides of said slides, said side gripping members being adapted to grip the top side edge portion of each and every slide in said stack of slides on opposite sides of said slides with the substantially flat faces of said slides substantially perpendicular to said elongated side gripping members, said first member always resiliently biasing said side gripping members toward a first relative position in which said side gripping members are spaced apart a distance which is less than the length of the top and bottom edge of each of said slides, and said side gripping members being adapted to be movable relative to each other to a second relative position by resilient flexing of said first member to its deformed profile shape, said second relative position of said side gripping members being a position in which said side gripping members are spaced apart a distance greater than the length of the top and bottom edge of each of said slides, said side gripping members being biased toward said first relative position by said inherent biasing force of said first member even when they are in said second relative position; and a pair of spaced apart manual gripping means integrally formed with at least one of said first member and said pair of side gripping members via a living-hinge-type connection and being foldable about said living-hinge-type connection relative to said first member between an operative position where said manual gripping means extend upwardly relative to said first member and a folded storage position, said gripping means comprising respective bearing surfaces adjacent said living-hinge-type connection for abutting against said first member when said manual gripping means are in their operative positions, said manual gripping means, when in said operative position, being manually grippable and movable toward each other to flex said first member against said inherent bias thereof to cause said side gripping members to move apart to said second relative position in which said spacing between said side gripping members exceeds said length of the top and bottom edge of each of said slides, said side gripping members being resiliently biased by said first member towards said first position so that after release of said manual gripping means said side gripping members resiliently move toward their said first position to clamp the upper side edge portions of said slides of said stack between said side gripping members such that said slides are held in a stack by said side gripping members.

9. The slide holder and transfer device of claim 8 wherein said side gripping members are integrally formed with said first resilient biasing member and extend generally perpendicularly therefrom.

10. The slide holder and transfer device of claim 8 wherein said manual gripping means, when in said folded storage position, lie in a plane substantially parallel to the plane of said first resilient biasing member.

11. A slide holder and transfer system including a group of rigid generally flat and generally rectangular photographic slides arranged in a stack, the side, top and bottom edges of said slides defining the generally rectangular shape thereof, and a device for receiving, releasably holding and transferring the slides in a stacked condition, the receiving, holding and transferring device comprising:

a first resilient biassing member normally in a given profile shape and being resiliently bendable against an inherent biassing force to a deformed profile shape, for bridging the stack of slides over one of the top or bottom edge of each generally rectangular slide of said stack of slides, and over the length or height of said stack of slides;

a pair of spaced apart elongated side gripping members coupled to and extending from opposite sides of said first member and extending from said first member a distance substantially less than the length of the sides of the slides, said side gripping members being adapted to grip the top side edge portion of each and every slide in said stack of slides on respective opposite side edges of said slides with the substantially flat faces of said slides substantially perpendicular to said elongated side gripping members, said first member always overlying the top ends of said slides and resiliently biassing said side gripping members toward a first relative position in which said side gripping members are spaced apart a distance which is less than the length of the top and bottom edge of each of said slides, and said side gripping members being adapted to be moveable relative to each other to a second relative position by resilient flexing of said first member to its deformed profile shape, said second relative position of said side gripping members being a position in which said side gripping members are spaced apart a distance greater than said length of the top and bottom edges of each of said slides, said side gripping members being biased toward said first relative position by said inherent biassing force of said first member even when they are in said second relative position; and a pair of spaced apart manual gripping means, each being integrally formed with said first member via a living-hinge-type connection and being foldable relative to said first member about said living-hinge-type connection, said manual gripping means being adapted to be manually gripped and moved toward each other to flex said first member against said inherent bias thereof to cause said side gripping members to move apart to said second relative position in which said spacing between said side gripping members exceeds said length of the top or bottom edge of each of said slides, said side gripping members being resiliently biassed by said first member towards said first position so that after release of said manual gripping means, said side gripping members resiliently move toward their said first position to clamp the upper side edge portions of said slides of said stack between said side gripping members such that said slides are held in a stack by said side gripping members.

12. The system of claim 11 wherein said manual gripping means are foldable to a position so as to be located in a position substantially parallel with said first member, and comprising respective bearing surfaces adjacent said living-hinge-type connection for abutting against said first member when said manual gripping means are in their upstanding positions relative to said first member.

* * * * *